United States Patent

[11] 3,536,138

| [72] | Inventor | Bernard Laska<br>Duncan, Nebraska 68634 |
|---|---|---|
| [21] | Appl. No. | 797,814 |
| [22] | Filed | Feb. 10, 1969 |
| [45] | Patented | Oct. 27, 1970 |

[54] IRRIGATION WELL CASING CONNECTOR
2 Claims, 6 Drawing Figs.

[52] U.S. Cl. ................................................. 166/315,
166/242; 285/417, 285/420, 285/423
[51] Int. Cl. .................................................. F16l 21/00
[50] Field of Search ........................................... 166/242,
315; 285/420, 260, 423, 398, 424, 417; 287/108;
29/155, 155(C)

[56] References Cited
UNITED STATES PATENTS

| 311,299 | 1/1885 | Elliott | 285/424X |
|---|---|---|---|
| 854,334 | 5/1907 | Cruse | 285/424X |
| 1,420,669 | 6/1922 | Schutte | 287/108X |
| 2,246,370 | 6/1941 | Lewis | 285/424X |
| 3,251,613 | 5/1966 | Tatsch | 285/423X |

FOREIGN PATENTS

| 647,059 | 6/1937 | Germany | 285/424 |

*Primary Examiner*—Dave W Arola
*Attorneys*—Clarence A. O'Brien and Harvey B. Jacobson ABSTRACT: A connector for retaining well casing sections connected together in end to end abutting engagement for use in irrigation wells with the casing being in the form of a nonmetallic pipe of relatively large diameter with the connectors being in the form of straps bridging the joint being casing sections and being secured to each section.

Patented Oct. 27, 1970

Bernard Laska
INVENTOR.

BY *Clarence A. O'Brien*
and *Harvey B. Jacobson*
Attorneys

Patented Oct. 27, 1970

Bernard Laska
INVENTOR.

BY *Clarence A. O'Brien*
and *Harvey B. Jacobson*
Attorneys

IRRIGATION WELL CASING CONNECTOR

The present invention generally relates to irrigation well casings and more particularly such casings constructed of nonmetallic pipe sections and connectors for connecting the adjacent ends of the casing sections in abutting end-to-end engagement.

In running well casings into a well bore, metal pipe sections are employed with the sections being secured together by a screw-threaded coupling thus requiring that an upper pipe section be threaded into an already installed pipe section in the well bore in a repetitive operation. The metal pipe sections are quite expensive and extremely heavy thus requiring elaborate equipment for installing a well casing in a well bore.

An object of the present invention is to provide an irrigation well casing constructed of relatively large diameter tubular pipe sections constructed of nonmetallic material with the ends of the casing sections being connected together in end-to-end abutting engagement by a plurality of relatively narrow connecting straps riveted to the connected casing sections thereby eliminating the necessity of providing a threaded engagement between adjacent casing sections and greatly simplifying and facilitating installation of the well casing.

A further object of the present invention is to provide an irrigation well casing connector which is simple in construction, easy to install, effective for its purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
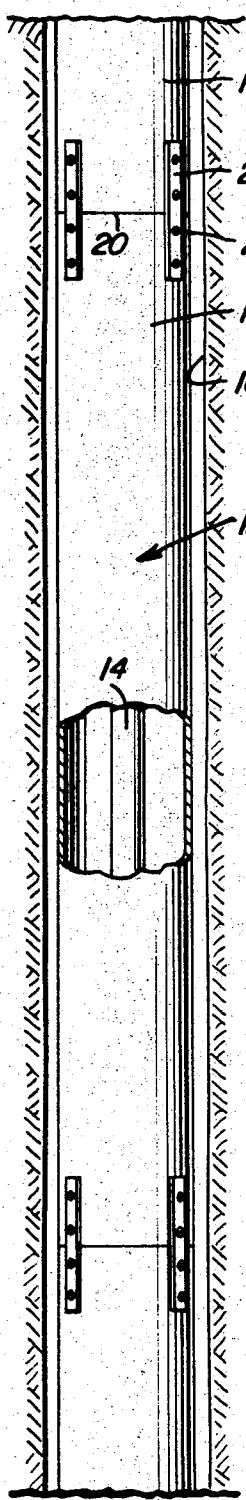
FIG. 1 is an elevational view of a well casing installed in a well bore incorporating the connector of the present invention therein.
Figure 4:
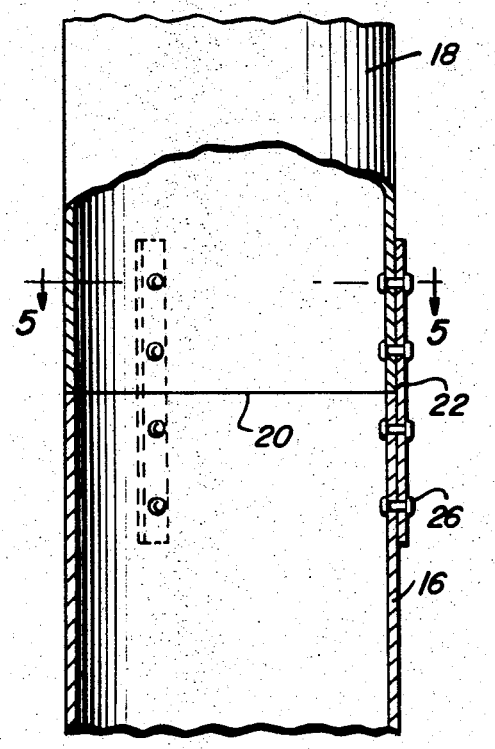
FIG. 4 is a detailed sectional view along the center of one of the connectors illustrating the structure thereof and the association of the casing sections.
Figure 5:
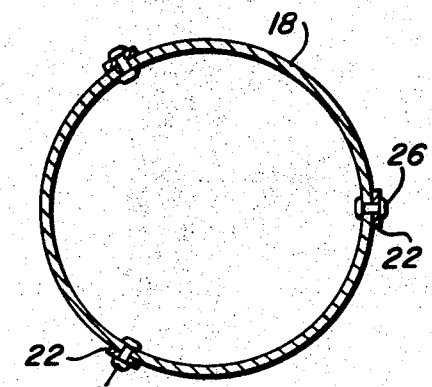
FIG. 5 is a transverse, sectional view taken substantially upon the plane passing along section line 5–5 of FIG. 4 illustrating further structural details of the connectors.
Figure 6:
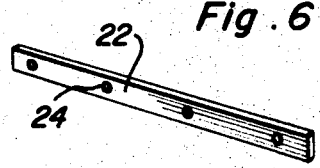
FIG. 6 is a perspective view of one of the connectors.

In FIG. 1, an irrigation well bore is designated by the numeral 10 with a well casing generally designated by the numeral 12 installed therein and reaching from ground level or a point above ground level to the bottom of the well bore or a point adjacent the bottom of the well bore with the well casing receiving a production tube, pipe or the like 14 by which water may be delivered from the bottom of the well casing 12 to the top thereof for use in a manner well known. As illustrated in FIG. 4, the well casing 12 includes tubular sections or casing sections 16 and 18 with the ends of the sections 16 and 18 disposed in abutting engagement as indicated by numeral 20. The sections 16 and 18 are retained in abutting engagement by a plurality of circumferentially spaced longitudinally disposed connecting straps 22 each having longitudinally spaced apertures 24 formed therein receiving fasteners such as rivets 26 securing the strap 22 to the sections 16 and 18 thereby fixedly connecting the casing sections 16 and 18 in abutting end-to-end vertical alignment as illustrated in FIG. 4.

Figure 2:
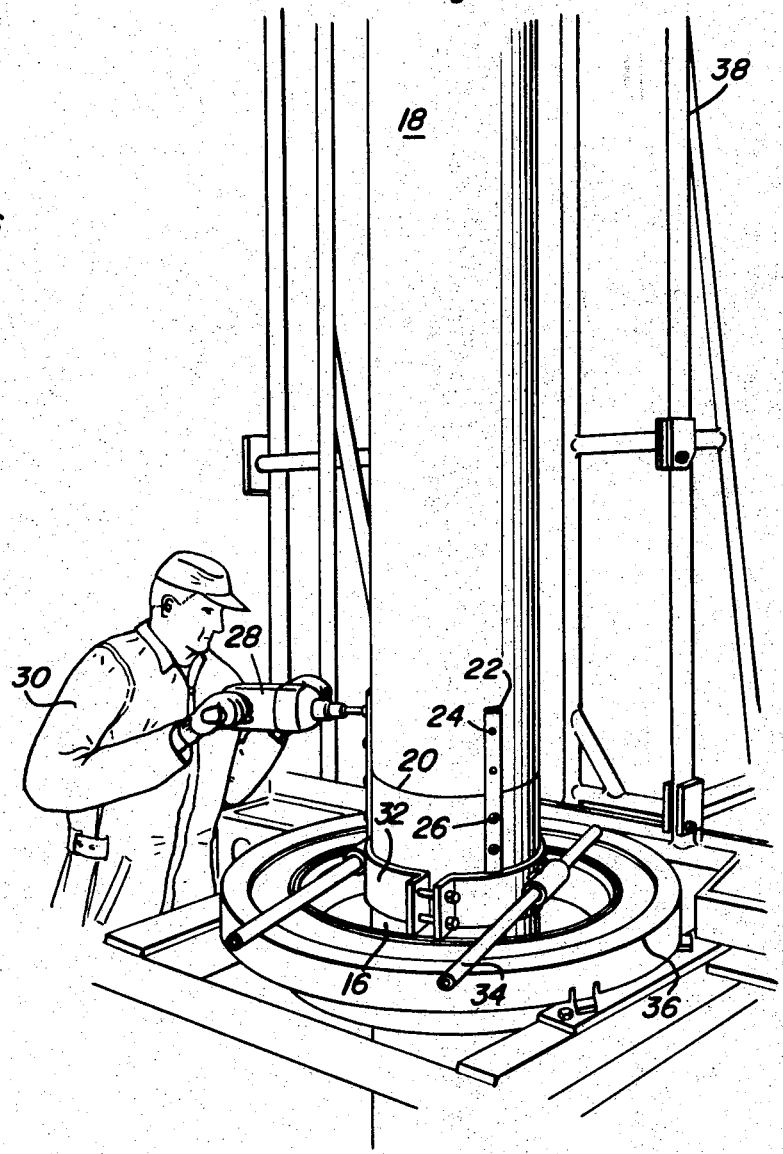
FIG. 2 is a fragmental perspective view illustrating the manner in which the casing sections are interconnected with a lower section disposed in the well bore and an upper section aligned and abutted therewith.
Figure 3:
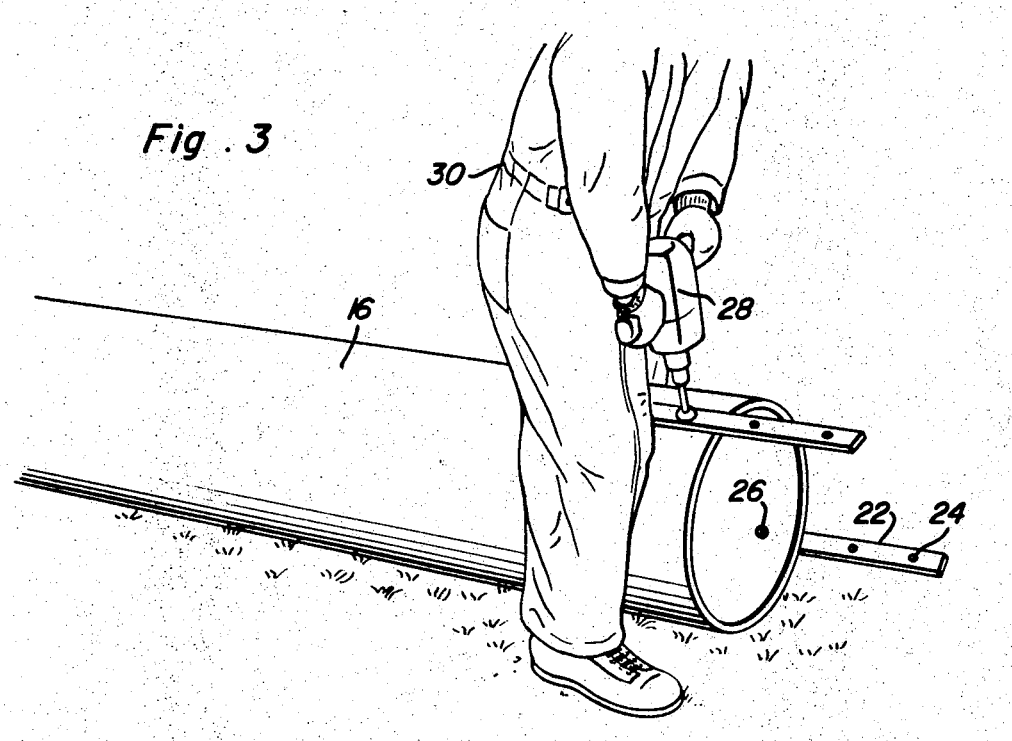
FIG. 3 is a perspective view of the manner of installation of the straps on one end of the casing section before installation in the well bore.

As illustrated in FIG. 3, before the casing section 16 is lowered into the well bore, three of the straps 22 are secured thereto by the use of the fasteners or rivets 26 by the use of a suitable riveting apparatus 28 operated by a workman 30 so that substantially one half of the straps 22 will project beyond the upper end of the casing section 16 when lowered into the well bore. The casing section 16 when lowered into the well bore is supported above the upper end thereof as illustrated in FIG. 2 by conventional clamping mechanism 32, supporting rods 34 and an annular framework 36 of conventional equipment employed with well completion apparatuses. The upper casing section 18 is then lifted by a lift mechanism including a framework 38, the details of which are not shown until the upper casing section 18 is in alignment with the lower casing section 16 at which time the upper casing section 18 is lowered into abutting engagement with the lower casing section 16. Then, by employing the same apparatus 28, the workman 30 fastens the upper ends of the connecting straps 22 to the upper casing section 18 thus joining the two casing sections. Thereafter, the clamp mechanism 32 is released and the assembled casing sections 16 and 18 are lowered until the upper end of the casing section 18 is in the position with the upper end thereof above the frame 36 at which point the clamps 32 are again operated to clampingly support the casing sections at which time another casing section may be assembled. Thus, each casing section will have the straps 22 fixed to the upper end thereof so that it is only necessary to fasten the connector straps 22 to the lower end of an upper casing section when running the casing into the well bore.

The connectors retain the casing sections in abutting engagement without any overlapping of the casing sections thus enabling the entire length of the casing section to be utilized. Further, this eliminates the necessity of threadedly rotating the casing sections in relation to each other thus facilitating the installation procedure and enabling less equipment to be used for this purpose. As the length of the casing increases and the aggregate weight of the casing increases due to its increase in length, a larger number of straps may be employed for supporting the weight of the casing. The straps may be constructed of any suitable metal material and the rivets are commercially available drive rivets. By practicing this invention, a casing may be installed in an irrigation well with a considerable reduction in the time required as well as a considerable reduction in the cost of the casing, the number of people required to install the casing and the equipment necessary for installation thereof.

The holes formed in the straps may be formed with any suitable drilling apparatus and the holes may be formed in the lightweight cementitious pipe by employing a conventional drill and various types of fastening devices may be employed for securing the straps in position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In an irrigation well casing consisting of a plurality of sections of pipe oriented in vertical alignment within a well bore and placed sequentially into the well bore with the aligned sections being connected at a point above the upper end of the well bore, that improvement comprising the use of tubular pipe sections as a well casing with the above the upper end of the well bore, and connectors fixedly attached to the exterior surface adjacent well casing sections and anchoring the sections in abutting end-to-end engagement, said connectors being attached to the upper end of a lower casing section prior to insertion in the well bore thereby requiring that only the lower end of an upper well casing section be attached to the straps above the well bore to facilitate installation of the casing, said straps being secured to the casing sections by the use of a plurality of fasteners, each connector being in the form of an elongated narrow strap secured axially to the pipe sections and bridging the ends of abutting pipe sections, said straps being disposed in substantially equal circumferentially spaced relation, and wherein said fasteners comprise drive type rivets to enable connection of the straps to the exterior of the pipe sections without having access to the interior of the pipe sections, said pipe section being constructed of nonmetallic material, said straps being constructed of metallic material.

2. The method of installing an irrigation well casing consisting of a plurality of sections of pipe oriented in vertical alignment within a well bore comprising the steps of attaching a plurality of relatively narrow elongated straps to one end of a pipe section in substantially equal circumferentially spaced relation thereon and with substantially one-half of the length of the strap projecting beyond the end of the pipe sections, lowering the pipe section into the well bore with the end having the straps attached thereto disposed upwardly, supporting the lowered pipe section in the well bore independent of the floor of the well bore with the upper end thereof having the straps attached thereto disposed above the upper end of the well bore, attaching a plurality of straps in the same manner to one end of a second pipe section, elevating the second pipe section with the strap attached end thereof uppermost orienting the second pipe section in abutting end-to-end engagement and alignment with the upper end of the pipe section supported in the well bore and in telescoping relation to the upper ends of the straps attached to the supported pipe section, anchoring the upper end portions of the straps attached to the supported pipe section to the lower end of the second pipe section thereby connecting the two pipe sections in abutting end-to-end engagement and alignment, releasing the supported pipe section and lowering the connected pipe sections into the well bore and supporting the second pipe section independent of the floor of the well bore with the upper end thereof projecting about the well bore and continuing this procedure to install a complete irrigation well casing.